(12) United States Patent
Wada et al.

(10) Patent No.: US 6,724,574 B2
(45) Date of Patent: Apr. 20, 2004

(54) HEAD GIMBAL ASSEMBLY HAVING AN ENCASED DRIVE IC CHIP

(75) Inventors: Takeshi Wada, Tokyo (JP); Mitsuyoshi Kawai, Tokyo (JP); Takao Matsumoto, Tokyo (JP); Atsushi Hirose, Tokyo (JP); Masashi Shiraishi, Tokyo (JP)

(73) Assignee: TDK Corporation, Tokyo (JP)

( * ) Notice: Subject to any disclaimer, the term of this patent is extended or adjusted under 35 U.S.C. 154(b) by 285 days.

(21) Appl. No.: 09/781,227

(22) Filed: Feb. 13, 2001

(65) Prior Publication Data

US 2001/0022708 A1 Sep. 20, 2001

(30) Foreign Application Priority Data

Mar. 16, 2000 (JP) .................................. 2000-073705

(51) Int. Cl.[7] ................................................. G11B 5/48
(52) U.S. Cl. .................................................. 360/244.1
(58) Field of Search .......................... 360/244.1, 97.02, 360/97.03; 361/751, 760–762, 764

(56) References Cited

U.S. PATENT DOCUMENTS

| 5,305,168 A | * | 4/1994 | Lin et al. ..................... 360/246 |
| 5,859,746 A | * | 1/1999 | Ishida et al. .............. 360/97.01 |
| 6,282,062 B1 | * | 8/2001 | Shiraishi .................. 360/244.1 |

* cited by examiner

*Primary Examiner*—George J. Letscher
(74) *Attorney, Agent, or Firm*—Burns, Doane, Swecker & Mathis, L.L.P.

(57) ABSTRACT

A HGA includes a magnetic head slider having at least one thin-film magnetic head element, an IC chip having a circuit for the at least one thin-film magnetic head element, and a suspension for supporting the magnetic head slider and the IC chip. All surfaces of the IC chip are coated by additional insulation layers.

10 Claims, 4 Drawing Sheets

HEAD GIMBAL ASSEMBLY HAVING AN ENCASED DRIVE IC CHIP

FIELD OF THE INVENTION

The present invention relates to a head gimbal assembly (HGA) with an IC (integrated circuit) chip for a thin-film magnetic head used in a magnetic hard disk drive (HDD) for example and a manufacturing method of the HGA.

DESCRIPTION OF THE RELATED ART

In the magnetic HDD, thin-film magnetic head elements for writing magnetic information into and/or reading magnetic information from magnetic disks are in general formed on magnetic head sliders flying in operation above the rotating magnetic disks. The sliders are supported at top end sections of suspensions of the HGAs.

Recently, recording data rate in the magnetic disk rapidly increases to satisfy the requirement for ever increasing data storage capacities and densities in today's HDDs. In order to achieve higher frequency recording, proposed configuration is a HGA structure with a suspension for supporting both a magnetic head slider and a drive IC chip of a driver circuit for the magnetic head element. According to this structure, since the length of trace conductors from the driver circuit to the magnetic head element can be shortened, generation of unnecessary noises from the trace conductors can be effectively suppressed resulting high frequency recording characteristics to improve.

The IC chip may be however heated to a high temperature due to the writing current flowing through itself during recording operations. In order to cool the heated IC chip by air flowing produced by the rotating magnetic disk, the IC chip will be mounted on a surface of the suspension, which counters the magnetic disk surface in operation.

The HGA with the IC chip will have a larger thickness increased by the mounting height of the IC chip. Generally, in the HDD, in order to increase the record capacity per magnetic disk, both sides of the disk are used for recording, and in addition, a plurality of the magnetic disks are axially mounted. Therefore, two HGAs for writing/reading magnetic information will exist between the two magnetic disks, and thus the whole thickness of the magnetic disk device equipped with the HGAs with IC chips becomes great. This large thickness of the magnetic disk device will become a big problem particularly when the magnetic disk device is mounted in a thin notebook type personal computer.

Therefore, it is required for such an IC chip to be fabricated thinner than a general-purpose IC chip. Namely, the general-purpose IC chip has a thickness of about 0.3–0.4 mm, whereas the IC chip for the thin-film magnetic head has a thickness less than 0.25 mm, for example a thickness of about 0.12 mm.

The C4 (Controlled Collapse Chip Connection) process is a typical process for mounting such an IC chip on a suspension. In the C4 process, first, flux for solder material is applied to bump balls of the IC chip and then the IC chip is bonded to connection pads by reflow heat bonding.

If the mounting of the IC chip is performed by the reflow soldering using flux, it is necessary to execute the cleaning process after bonding. Namely, in the C4 bonding process, flux is applied to bumps on the IC chip surface, in order to promote melting of the solder and temporarily adhere the IC chip to the suspension during reflow soldering. Since the applied flux may have adverse effect of producing out gas for example, the cleaning has to be done after bonding.

This cleaning process will exert an influence upon the suspension. Namely, although high accuracy is required in a bending angle of the suspension, this bending angle may unintentionally change during the cleaning process. Thus, it is difficult to use the C4 process in the mounting of the IC chip on the suspension.

An ultrasonic bonding can be carried out without executing the cleaning process. In the ultrasonic bonding process, no solder bump is used but gold (Au) bumps formed on the IC chip are used. Namely, bonding is executed by applying an appropriate pressure and ultrasonic vibration to the Au bumps that are contacting with the respective Au pads on the suspension so as to be active Au for bonding. Since no soldering flux is utilized in this ultrasonic bonding process, cleaning process is not necessary used.

However, if the IC chip is caught with strong force by an ultrasonic bonding head and a heavy load and great ultrasonic power are applied from the bonding head to this very thin and small IC chip in order to mount it in the ultrasonic bonding process, damages such as scratches or cracks may be produced on the IC chip back surface.

If a few damages such as scratches or cracks arise on the IC chip surface, a silicon particle falling from this IC chip may occur. This is never allowed in the HDD. Namely, in the HDD, generally, since the magnetic head slider flies at extremely low height above the rotating disk for performing reading/writing operations, no dust is allowed to exist.

SUMMARY OF THE INVENTION

It is therefore an object of the present invention to provide a HGA with an IC chip and a manufacturing method of the HGA whereby no falling particles from the IC chip will occur.

According to the present invention, a HGA includes a magnetic head slider having at least one thin-film magnetic head element, an IC chip having a circuit for the at least one thin-film magnetic head element, and a suspension for supporting the magnetic head slider and the IC chip. All surfaces of the IC chip are coated by additional insulation layers.

Since all surfaces of the IC chip are coated by the additional insulation layers, chippings produced on the IC chip due to dicing of the IC chip from a wafer and/or damages such as scratches or cracks produced on the IC chip back surface due to catching by the ultrasonic bonding head when mounting the IC chip will be wholly covered by the additional insulation layers. Thus, particle falling from the IC chip can be completely prevented from occurring. Furthermore, cracks on the IC chip can be prevented from being produced even when a certain shock is applied to the IC chip after mounting.

It is preferred that the additional insulation layers include an underfill layer filled in a standoff between the IC chip and the suspension. Also, it is preferred that the additional insulation layers include an insulation coating layer for covering a top surface and side surfaces of the IC chip.

The underfill layer and the insulation coating layer may be formed by the same insulation material, or by different insulation materials.

It is preferred that the additional insulation layers are made of a material containing a resin material. Preferably, the additional insulation layers are made of a mixture of a resin material and an insulation material with high heat conductivity.

It is also preferred that the additional insulation layers are made of a material with a viscosity of 0.5–80 Pa·s at the room temperature (25° C.). If the viscosity of the filling and coating insulation materials is kept within this range, the thickness of the HGA will not so increase due to the additional insulation layers covering all the surfaces of the IC chip.

According to the present invention, also, a method for manufacturing a HGA includes a first step of mounting a magnetic head slider having at least one thin-film magnetic head element and an IC chip having a circuit for the at least one thin-film magnetic head element on a suspension, a second step of filling a first insulation material into a clearance between the IC chip and the suspension, and a third step of coating a second insulation layer onto a top surface and side surfaces of the IC chip.

It is preferred that the first and second insulation materials are formed by the same insulation material, or by different insulation materials.

It is preferred that the first and second insulation materials are made of a material containing a resin material. Preferably, the first and second insulation materials are made of a mixture of a resin material and an insulation material with high heat conductivity.

It is further preferred that the second step includes dispensing at least one drop of the first insulation material in liquid state from a needle onto the suspension near the IC chip to fill the first insulation material into the clearance between the IC chip and the suspension.

Preferably, third step includes dispensing at least one drop of the second insulation material in liquid state from a needle onto a center portion of the top surface of the IC chip so that the top surface and the side surfaces of the IC chip are coated by the second insulation material.

Also, preferably, the third step includes dispensing drops of the second insulation material in liquid state from a needle scanning over the top surface of the IC chip so that the top surface and the side surfaces of the IC chip are coated by the second insulation material.

It is preferred that the additional insulation layers are made of a material with a viscosity of 0.5–80 Pa·s at the room temperature (25° C.). If the viscosity of the filling and coating insulation materials is kept within this range, the thickness of the HGA will not so increase due to the additional insulation layers covering all the surfaces of the IC chip.

Further objects and advantages of the present invention will be apparent from the following description of the preferred embodiments of the invention as illustrated in the accompanying drawings.

DESCRIPTION OF THE PREFERRED EMBODIMENTS

Figure 1:
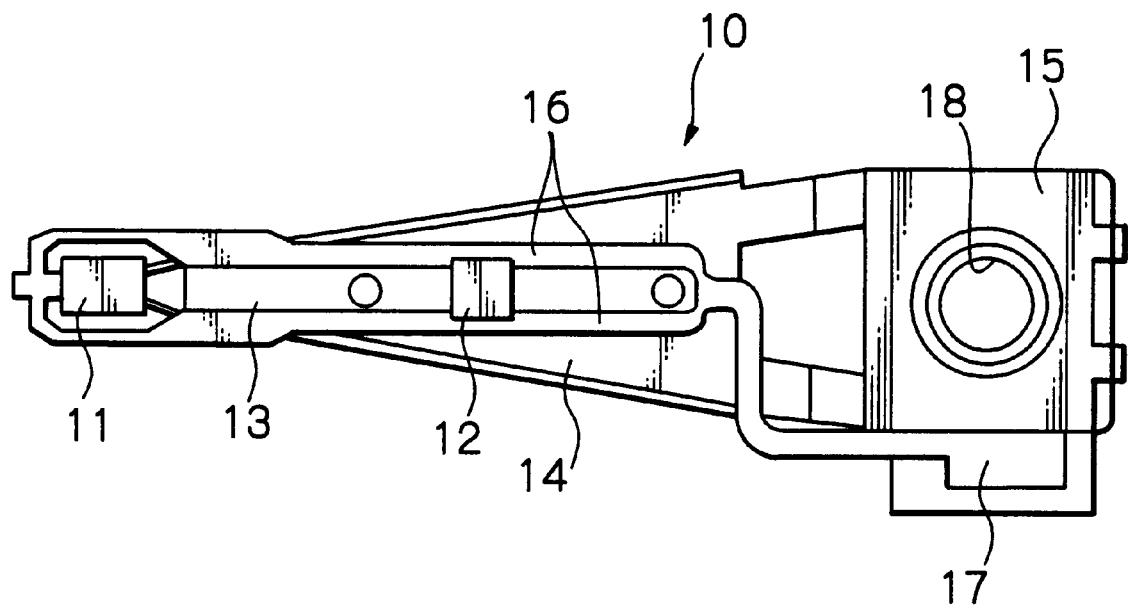
FIG. 1 shows a plane view schematically illustrating the whole structure of a HGA in a preferred embodiment according to the present invention.

FIG. 1 schematically illustrates the whole structure of a head gimbal assembly (HGA) in a preferred embodiment of the present invention.

As shown in the figure, the HGA is assembled by fixing a slider 11 having a thin-film magnetic head element to a top end section of a suspension 10, and by mounting a drive IC chip 12 for driving the magnetic head element and for amplifying a read-out signal from the magnetic head element on a middle location of this suspension 10. The slider 11 and the drive IC chip 12 are fixed on a surface of the suspension 10, which will oppose to the magnetic disk surface in operation. This surface of the suspension is called hereinafter as a slider-attached surface.

The suspension 10 is substantially constituted by a resilient flexure 13 for carrying the slider 11 at its tongue located near its top end section and supports the drive IC chip 12 at its middle section, a resilient load beam 14 for supporting and fixing the flexure 13, and a base plate 15 formed at a base end section of the load beam 14.

The load beam 14 has elasticity for pressing the slider 11 toward the direction of the magnetic disk in operation. The flexure 13 has the flexible tongue centered by a dimple formed on the load beam 14 and has elasticity for supporting the slider 11 flexibly by this tongue. As will be noted, in this embodiment, the suspension 10 has a three-piece structure constituted by individual components of the flexure 13, the load beam 14 and the base plate 15. In such a three piece structure, stiffness of the flexure 13 is set to be lower than that of the load beam 14.

In the drive IC chip 12, an integrated driver circuit and a read-out signal amplifying circuit constituting a head amplifier of the magnetic head element are formed. Although it is mere examples, the size of the IC chip 12 may be 1.0 mm×1.0 mm×0.15 mm or 1.5 mm×1.5 mm×0.25 mm. The fixed position of the IC chip 12 on the suspension 10 is in this embodiment determined so as to improve heat radiation characteristics and electromagnetic characteristics and to make mounting of the IC chip easy.

The flexure 13 is made of in this embodiment a stainless steel plate (for example SUS304TA) with a thickness of about 25 μm. This flexure 13 has a uniform width smaller than that of the load beam 14.

A trace conductor layer 16 of a thin-film pattern that constitutes necessary number of input/output signal lines is formed on the flexure 13 along its length. One end of the trace conductor 16 is connected to slider-connection pads for making electrical connection with the magnetic head slider 11 formed at the top end section of the flexure 13, and the other end of the trace conductor 16 is connected via the IC chip 12 to external connection pads 17 which will be connected to external circuits.

The load beam 14 is made of in this embodiment a resilient stainless steel plate with a thickness of about 60–65 μm and supports the flexure 13 along its whole length. This load beam 14 has a shape with a width that narrows with approaching to its top end. Fixing of the flexure 13 to the load beam 14 is achieved by means of a plurality of welded spots.

The base plate 15 is made of a stainless steel or iron and is fixed to the base end section of the load beam 14 by welding. The suspension 10 will be attached to each movable arm (not shown) by fixing an attachment part 18 of the base plate 15 to the movable arm.

In modification, the suspension may be formed in a two-pieces structure with a base plate and a flexure-load beam instead of the three-pieces structure with the flexure 13, the load beam 14 and the base plate 15.

As aforementioned, the slider 11 with the magnetic head element is mounted on the tongue of the flexure 13 at the top end section of the suspension 10. The trace conductor layer 16 which includes the necessary number of the input/output signal lines passes both sides of the slider 11 and turns back at the top end section of the flexure 13 to the slider-connection pads so as to be electrically connected with input/output electrodes of the slider 11. An insulation material layer made of the resin may cover the connected part.

The drive IC chip 12 is mounted on the slider-attached surface at the middle length location of the suspension 10.

Figure 2:
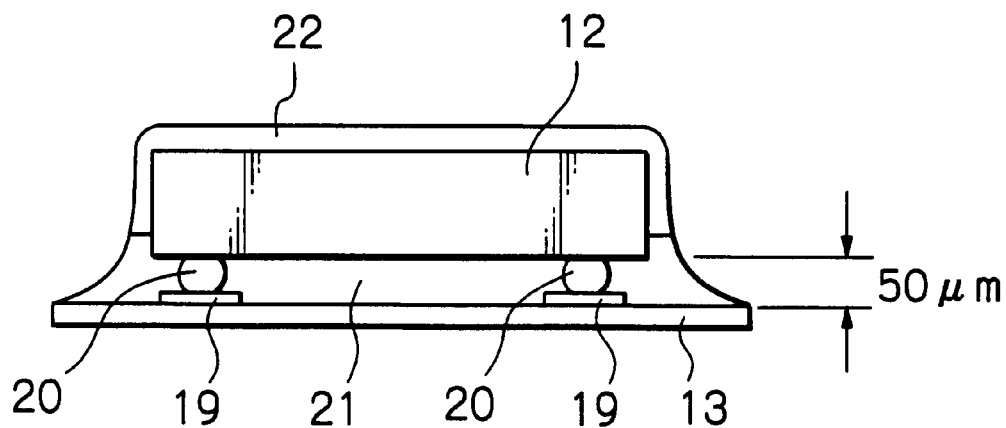
FIG. 2 shows a sectional view schematically illustrating mounted state of an IC chip of the embodiment shown in FIG. 1.

FIG. 2 schematically illustrates mounted state of the IC chip 12.

As shown in the figure, the IC chip 12 in this embodiment is formed by a bear chip and ball-bonded by Au balls 20 on chip-connection pads 19 formed on the way of the trace conductor layer 16 that is formed on the flexure 13 of the suspension 10 via an insulation material layer.

An underfill 21 is filled in a clearance of about 50 µm between the bottom surface of the IC chip 12 and the trace conductor layer surface so as to improve heat radiation characteristics and to improve mechanical strength of this area. A top surface and side surfaces of the IC chip 12 are coated by an additional insulation resin layer 22. Namely, all the surfaces of the IC chip 12 are covered by the underfill layer 21 and the insulation resin layer 22.

Hereinafter, a mounting process of the IC ship 12 to the suspension according to this embodiment will be described with reference to FIGS. 3a to 3d.

On the flexure 13 that is made of a stainless steel plate, the thin-film conductive pattern is formed by a well-known method similar to the patterning method of forming a printed circuit board on a thin metal plate such as a flexible printed circuit (FPC).

The bumps of Au balls 20 are preliminarily made on connection terminals formed on the bottom surface of the IC chip 12. This IC chip 12 is picked up by a ultrasonic bonding head or nozzle and aligned with the chip-connection pads 19 of the thin-film conductive pattern.

Then, the nozzle moves down until the Au ball bumps 20 of the IC chip 12 come in contact with the respective chip-connection pads 19 of the thin-film conductive pattern, and presses the IC chip 12 in a longitudinal direction so as to apply a load onto the IC chip 12 with application of ultrasonic vibration along lateral directions.

The depression due to the load and the application of ultrasonic vibration result made bonding of the Au ball bumps 20 of the IC chip 12 with the Au layer of the chip-connection pads 19. Thus, electrical connection between the connection terminals of the IC chip 12 and the chip-connection pads 19 is achieved.

Then, the underfill 21 is filled in the clearance between the bottom surface of the IC chip 12 and the trace conductor layer surface as follows for improving heat radiation characteristics, improving mechanical strength of this area, and covering a part of the bottom and side surfaces of the IC chip 12.

Figure 3A:
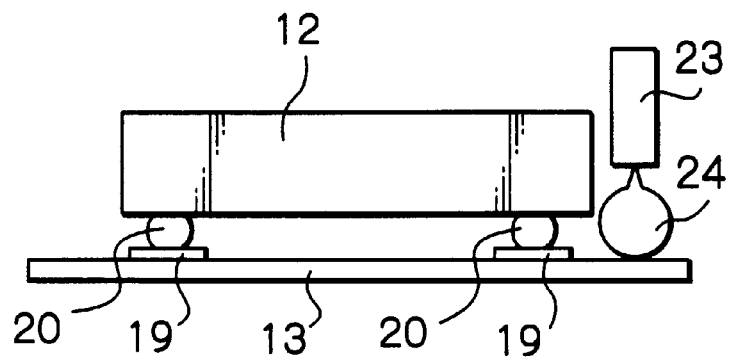
FIGS. 3a to 3d show sectional views illustrating parts of manufacturing processes of the HGA of the embodiment shown in FIG. 1.
Figure 3B:
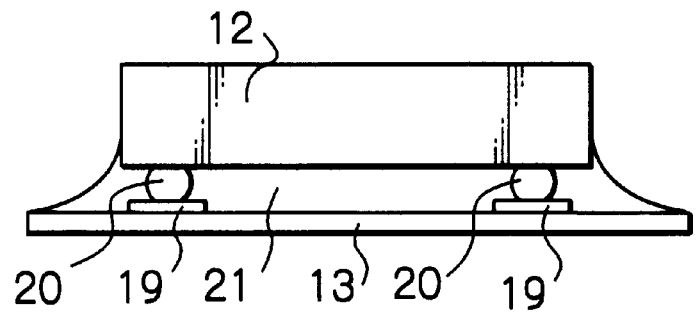

First, as shown in FIG. 3a, at least one drop 24 of an insulation resin material in liquid state to form the underfill layer 21 is dispensed from a needle 23 onto the flexure 13 near the IC chip 12 so that the at least one drop enters by its surface tension into the clearance between the bottom surface of the IC chip 12 and the trace conductor layer surface as shown in FIG. 3b. The liquid insulation resin material may be good heat conductivity liquid material made of for example mixture of a resin such as epoxy resin and insulation material with good heat conductivity.

Figure 3C:
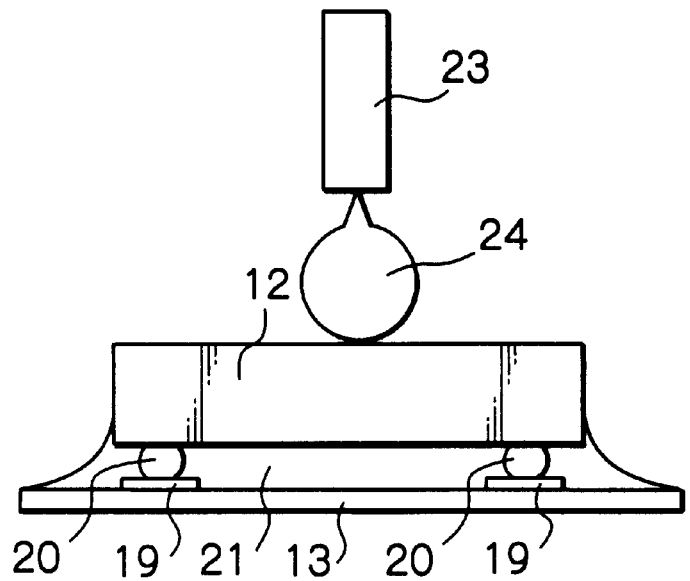
Figure 3D:
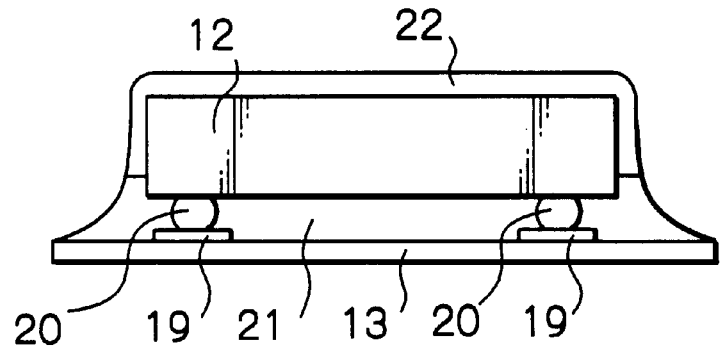

Then, as shown in FIG. 3c, at least one drop 24 of an insulation resin material in a liquid state is dispensed from the needle 23 onto the center portion of the top surface of the IC chip 12 so that the at least one drop spreads over and coats the whole of the top surface and the side surfaces of the IC chip 12 to form an insulation resin layer 22 as shown in FIG. 3d.

It is desired that a viscosity of the liquid insulation resin material is 0.5–80 Pa·s at the room temperature (25° C.). If the viscosity is lower than 0.5 Pa·s, as it is too easy to flow, a dam structure for preventing the liquid from spilling will be necessary. Contrary to this, if the viscosity is higher than 80 Pa·s, the height of the coated and cured insulation resin layer will become extremely high.

Figure 4:
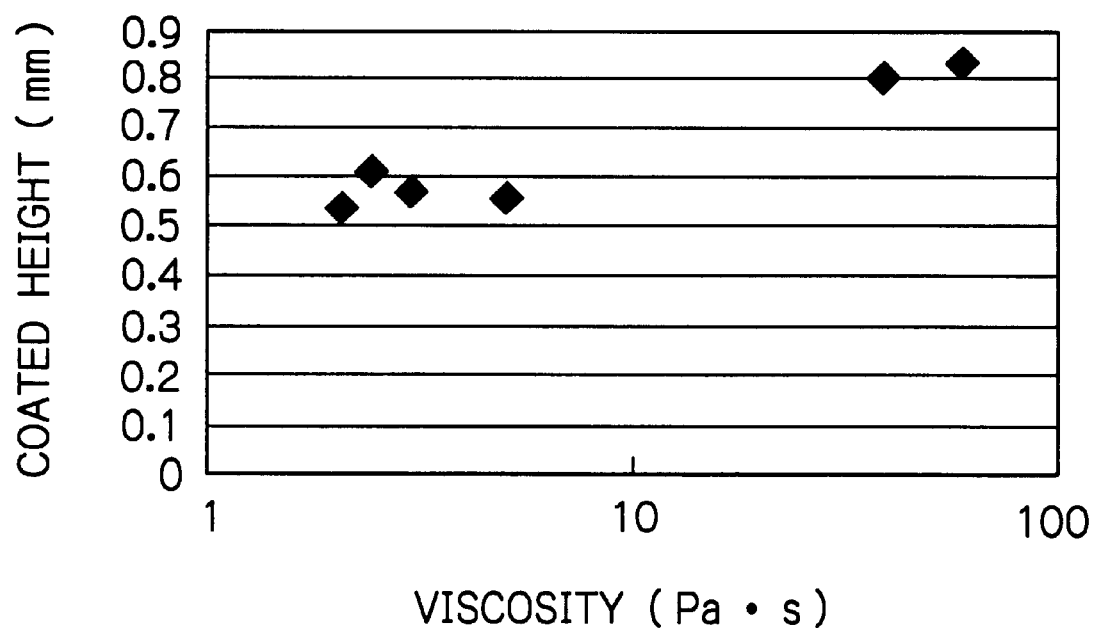
FIG. 4 shows a graph illustrating a relationship between a viscosity of an insulation resin material and a height of the coated insulation resin layer.

FIG. 4 illustrates a relationship between a viscosity of the insulation resin material and the height of the coated insulation resin layer, obtained by actually measuring the height of the coated insulation resin layer of samples with different viscosities of the insulation resin material. In this case, the environment temperature was kept constant at 25° C. because the coated height depends on the environment temperature.

As will be apparent from the figure, if the viscosity of the insulation resin material is kept equal to or lower than 80 Pa·s, the height of the coated insulation resin layer can be controlled at 1 mm or less. Thus, the additional insulation layers for entirely covering all surfaces of the IC chip mounted on the HGA can be formed without greatly increasing the thickness of the HGA at the IC chip mounting section.

The filled underfill layer 21 and the coated insulation resin layer 22 will be cured during a heat and dry process executed later.

The insulation resin material with good heat conductivity composing the underfill layer 21 and the insulation resin layer 22 may be for example a resin such as epoxy resin containing fused silica (heat conductivity ratio of about $50.4 \times 10^{-6}$ W/m·° C.), a resin containing alumina (heat conductivity ratio of about $168 \times 10^{-6}$ W/m·° C.), a resin containing crystal silica (heat conductivity ratio of about $147 \times 10^{-6}$ W/m·° C.), or a resin containing aluminum nitride (heat conductivity ratio of about $168 \times 10^{-6}$ W/m·° C.).

According to the embodiment, since all the surfaces of the IC chip 12 are entirely coated by the underfill layer 21 and the insulation coating layer 22, no particle falling from the IC chip occurs. Namely, during the ultrasonic bonding process, since the ultrasonic vibration generated by the ultrasonic bonding head is applied to the IC chip 12, friction will be always produced between the back surface of the IC chip 12 and the ultrasonic bonding head. In order to suppress this friction, it is necessary that the ultrasonic bonding head catches the IC chip 12 with a strong force. Thus, damages such as scratches or cracks may be easily produced on the IC chip surface. However, according to the above-mentioned embodiment, since all the surfaces of the IC chip 12 are entirely coated by the insulation resin material layers, no silicon particle falling from the IC chip 12 occurs even if damages such as scratches or cracks arise on the IC chip surface.

Furthermore, according to this embodiment, the underfill layer 21 and the insulation coating layer 22 can be easily formed by a simple process of dispensing the insulation resin material in liquid state from the needle 23. In addition, since the viscosity of the insulation resin material is set to 0.5–80 Pa·s at the room temperature (25° C.), the thickness of the HGA at the IC chip mounting section will not so increase and thus the whole height of the HGA can be prevented from greatly increasing.

Also, according to the embodiment, since the Au ball bumps 20 of the IC chip 12 are electrically and mechanically bonded with the Au layer of the chip-connection pads 19 by the ultrasonic bonding, no temporal fixing of the IC chip, no solder-flux transfer process, no reflow soldering nor flux-cleaning process is required.

In the aforementioned embodiments, also, the Au ball bumps 20 of the IC chip 12 and the Au layer of the chip-connection pads 19 are bonded by ultrasonic bonding. However, the present invention can be achieved by ultrasonic bonding using Cu balls and a Cu layer or using another metal balls and another metal layer instead of the Au balls and the Au layer. In modifications, the bumps may be formed on the chip-connection pads of the thin-film conductive pattern.

FIGS. 5a to 5d schematically illustrate parts of manufacturing processes of a HGA of another embodiment according to the present invention.

The process for filling the underfill 21 in the clearance between the bottom surface of the IC chip 12 and the trace conductor layer surface in this embodiment is completely the same as that of the embodiment shown in FIG. 1 (FIGS. 3a and 3b).

Figure 5A:
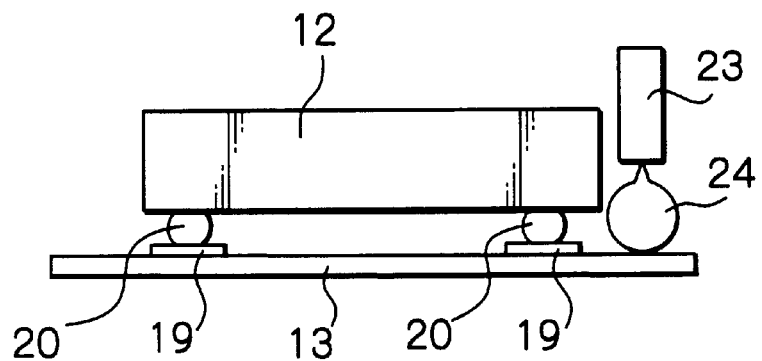
FIGS. 5a to 5d show sectional views illustrating parts of manufacturing processes of a HGA of another embodiment according to the present invention.
Figure 5B:
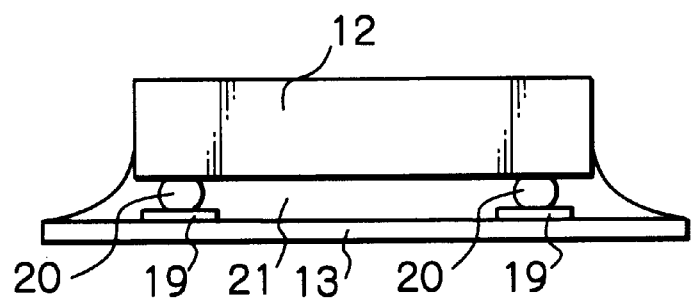

Namely, as shown in FIG. 5a, at least one drop 24 of an insulation resin material in liquid state to form the underfill layer 21 is dispensed from a needle 23 onto the flexure 13 near the IC chip 12 so that the at least one drop enters by its surface tension into the clearance between the bottom surface of the IC chip 12 and the trace conductor layer surface as shown in FIG. 5b. The liquid insulation resin material may be good heat conductivity liquid material made of for example mixture of a resin such as epoxy resin and insulation material with good heat conductivity.

Figure 5C:
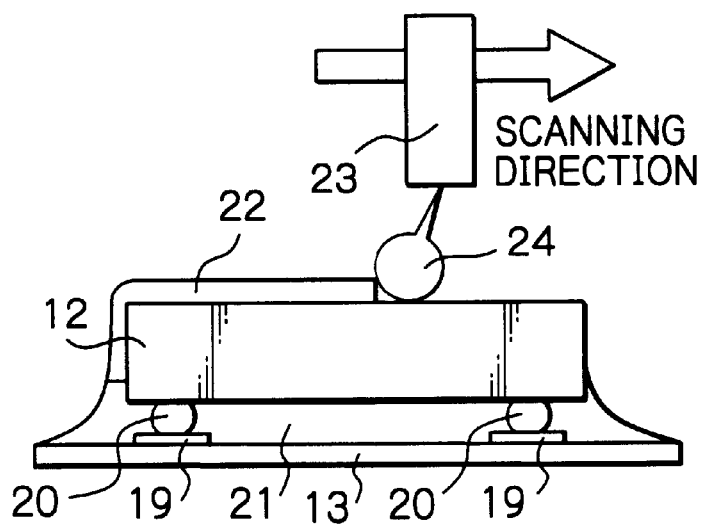
Figure 5D:
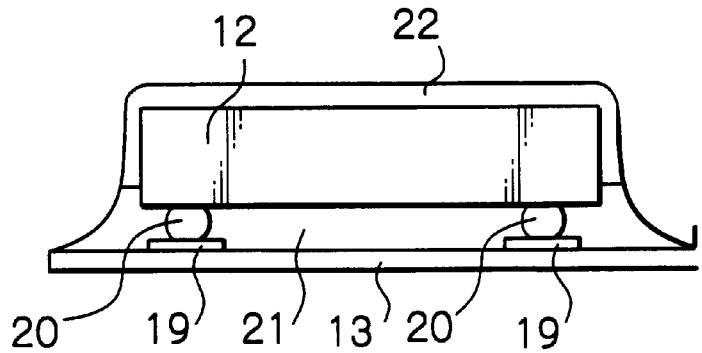

Then, as shown in FIG. 5c, drops 24 of an insulation resin material in liquid state are dispensed onto the top surface of the IC chip 12 from the needle 23 which is two-dimensionally scanned over the top surface of the IC chip 12 so that the drops spread over and coats the whole of the top surface and the side surfaces of the IC chip 12 to form an insulation rein layer 22 as shown in FIG. 5d.

Another configurations, operations, advantages and modifications in this embodiment are the same as these of the embodiment shown in FIG. 1. Thus, in this embodiment, the same reference numerals as these in the embodiment of FIG. 1 are used.

Many widely different embodiments of the present invention may be constructed without departing from the spirit and scope of the present invention. It should be understood that the present invention is not limited to the specific embodiments described in the specification, except as defined in the appended claims.

What is claimed is:

1. A head gimbal assembly comprising:

a magnetic head slider having at least one thin-film magnetic head element;

an IC chip having a circuit for said at least one thin-film magnetic head element; and a suspension for supporting said magnetic head slider and said IC chip, all surfaces of said IC chip being coated by additional insulation layers to form an underfill layer filled in a clearance between said IC chip and said suspension, and an insulation coating layer for covering a top surface and side surfaces of said IC chip, said underfill layer and said insulation coating layer being formed by the same insulation material.

2. The head gimbal assembly as claimed in claim 1, wherein said underfill layer and said insulation coating layer are formed by different insulation materials.

3. The head gimbal assembly in claim 1, wherein said additional insulation layers are made of a mixture of a resin material and an insulation material with high heat conductivity.

4. The head gimbal assembly as claimed in claim 1, wherein said additional insulation layers are made of a material with a viscosity of 0.5–80 Pa·s at the room temperature.

5. A head gimbal assembly comprising:

a magnetic head slider having at least one thin-film magnetic head element;

an IC chip having a circuit for said at least one thin-film magnetic head element; and a suspension for supporting said magnetic head slider and said IC chip, all surfaces of said IC chip being coated by additional insulation layers made of a mixture of a resin material and an insulation material with high heat conductivity.

6. The head gimbal assembly as claimed in claim 5, wherein said additional insulation layers include an underfill layer filled in a clearance between said IC chip and said suspension.

7. The head gimbal assembly as claimed in claim 5, wherein said additional insulation layers are made of a material with a viscosity of 0.5–80 Pa·s at the room temperature.

8. The head gimbal assembly as claimed in claim 6, wherein said additional insulation layers include an insulation coating layer for covering a top surface and side surfaces of said IC chip.

9. The head gimbal assembly as claimed in claim 8, wherein said underfill layer and said insulation coating layer are formed by the same insulation material.

10. The head gimbal assembly as claimed in claim 9, wherein said underfill layer and said insulation coating layer are formed by different insulation materials.

* * * * *